May 28, 1929.  C. E. FOSTER  1,714,664
RADIATION PYROMETER
Filed July 9, 1925
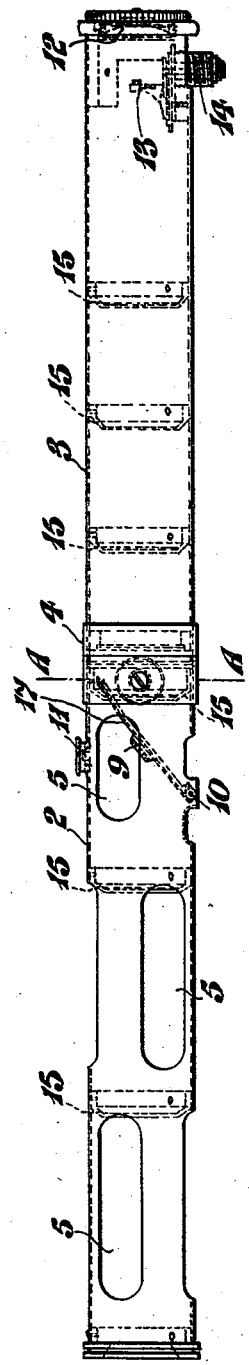
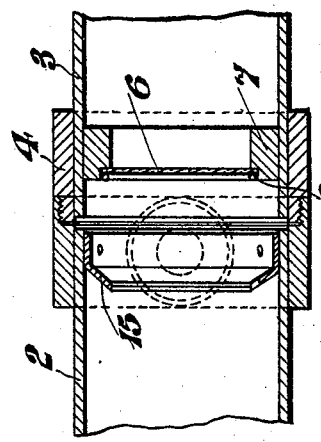
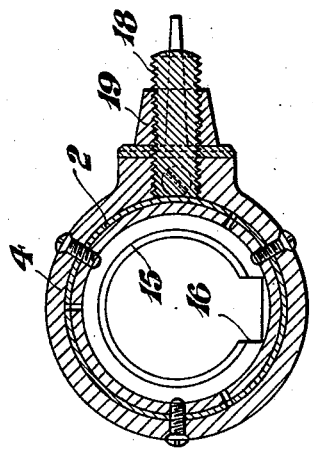
Inventor
Charles E. Foster
Herbert E. Smith
Attorney Patented May 28, 1929.

1,714,664

UNITED STATES PATENT OFFICE.

CHARLES EDWIN FOSTER, OF LETCHWORTH, ENGLAND.

RADIATION PYROMETER.

Application filed July 9, 1925, Serial No. 42,390, and in Great Britain November 15, 1924.

This invention relates to radiation pyrometers such as for instance of the fixed focus type as described in specifications of British Patents Nos. 30,478 of 1909 and 144,489, and has for its object to provide improved means for protecting from fumes, gases and vapours, the mirror or equivalent device and the therma-couple or other device therein sensitive to heat.

Heretofore a window transparent to heat radiations has been provided at or adjacent the front aperture of the receiving tube of the pyrometer, at such position it is however liable to rapid clouding by the action of dust or fumes.

The present invention consists of a radiation pyrometer of which the radiation receiving tube is closed at some distance from its open end by a transparent window. This window completely protects the sensitive portions of the instrument from dust and fumes, and the instrument does not need such frequent cleaning as heretofore. As an additional precaution the window itself may be protected against clouding by dust and fumes by providing openings in sides of the tube between its open end and the window, such openings being arranged to admit of cross vetilation of the tube.

To facilitate access to this window the tube or housing of the pyrometer may be made of two or more detachable portions, one point of detachment being arranged near the window.

Although the invention is particularly useful as applied to fixed focus radiation pyrometers, it is also applicable to other types of radiation pyrometers.

A method of carrying out the invention is illustrated by the accompanying drawings wherein Fig. 1 is a general view of the pyrometer tube, Fig. 2 a transverse section through A—A, Fig. 1, and Fig. 3 a longitudinal section of the portion of the tube containing the window.

In these drawings the main tube is divided into two portions 2 and 3 connected together by a screw joint 4. In the open end portion 2 of the tube are provided side ventilating openings 5, while in the portion 3 of the tube is provided near its end a transparent window 6. The window 6 is a disc of suitable transparent material detachably held in a recess in a ring 7 by means of a removable spring ring 8, the ring 7 being secured inside the tube 3 in any suitable manner near the screwed joint 4.

In the example illustrated in the portion 2 of the tube is provided a mirror 9 hinged at 10 to one side of the tube in such a manner that it can be brought into the inclined position under the eye piece 11, necessary to enable the position of the tube to be accurately adjusted. The end of the portion 3 of the tube contains a concave mirror 12, and at 13 a thermo-electric couple of which the leads pass down through a plug 14 in any suitable manner. Both portions of the tube are provided with diaphragms or apertures 15, the diaphragm 15 within the screw joint 4 being provided with a slot 16 to enable the supporting portion 17 to be turned down against the sides of the tube.

The front portion of the screwed joint 4 also carries a screwed trunnion pin 18 and nut 19 by which the tube can be fixed at the desired angle in a supporting stand.

What I claim and desire to secure by Letters Patent is:—

1. A pyrometer comprising a tube section having an open inner end and a section having a closed outer end, and detachable connecting means for said sections, a fixed diaphragm window closing the inner end of the section having the closed outer end, and a thermo-electric couple fixed in the outer end of said latter section.

2. In a pyrometer the combination with a pair of tube sections and a detachable connection therefor, of a detachable diaphragm window closing the inner end of one section and a closure for the outer end of said section, a thermo-electric couple enclosed near said outer end, and means for ventilating the interior of the other section.

3. In a pyrometer the combination with a pair of rigidly connected, detachable, tubular sections, of a closure for the outer end of one section and a thermo-electric couple enclosed adjacent said closure, a recessed supporting member near the opposite end of the latter section, a diaphragm window in said recessed supporting member, and a resilient retaining ring for said window.

4. A pyrometer comprising a pair of alined, joined tube sections one of which is open at one end and provided with side openings, a detachable diaphragm window and retaining means therefor adjacent the inner end of the other section, a thermo-electric couple located adjacent the outer end of the latter section, and a closure for said outer end.

5. A pyrometer comprising a pair of alined, joined tube sections one of which has an open end and side openings, a positioning mirror enclosed near the inner end of said section and a viewing opening therefor, a diaphragm window closing the inner end of the other section, a closure for the outer end of the latter section, and a thermo-electric couple located adjacent said outer end.

6. The combination with a tubular pyrometer-section having a plurality of spaced, interior, open-center supporting elements, a mirror closing one end of the section and an enclosed thermo-electric couple adjacent thereto, and a detachable diaphragm window and retaining means therefor closing the other end of said section.

7. The combination with a sectional, tubular, pyrometer and its intermediate connecting sleeve, of a threaded trunnion and clamp nut for fixing the parts in adjusted position, a concave mirror closing one end of a section and an enclosed thermo-electric couple adjacent thereto, a diaphragm window closing the inner end of said section, an inclined positioning mirror within the inner end of the other section and a viewing opening therefor, and said latter section having an open end and side openings.

In witness whereof I affix my signature.

CHARLES EDWIN FOSTER.